July 22, 1941.　　　K. P. RADO　　　2,250,393
CONTROL MECHANISM
Filed Oct. 16, 1937　　　4 Sheets-Sheet 1
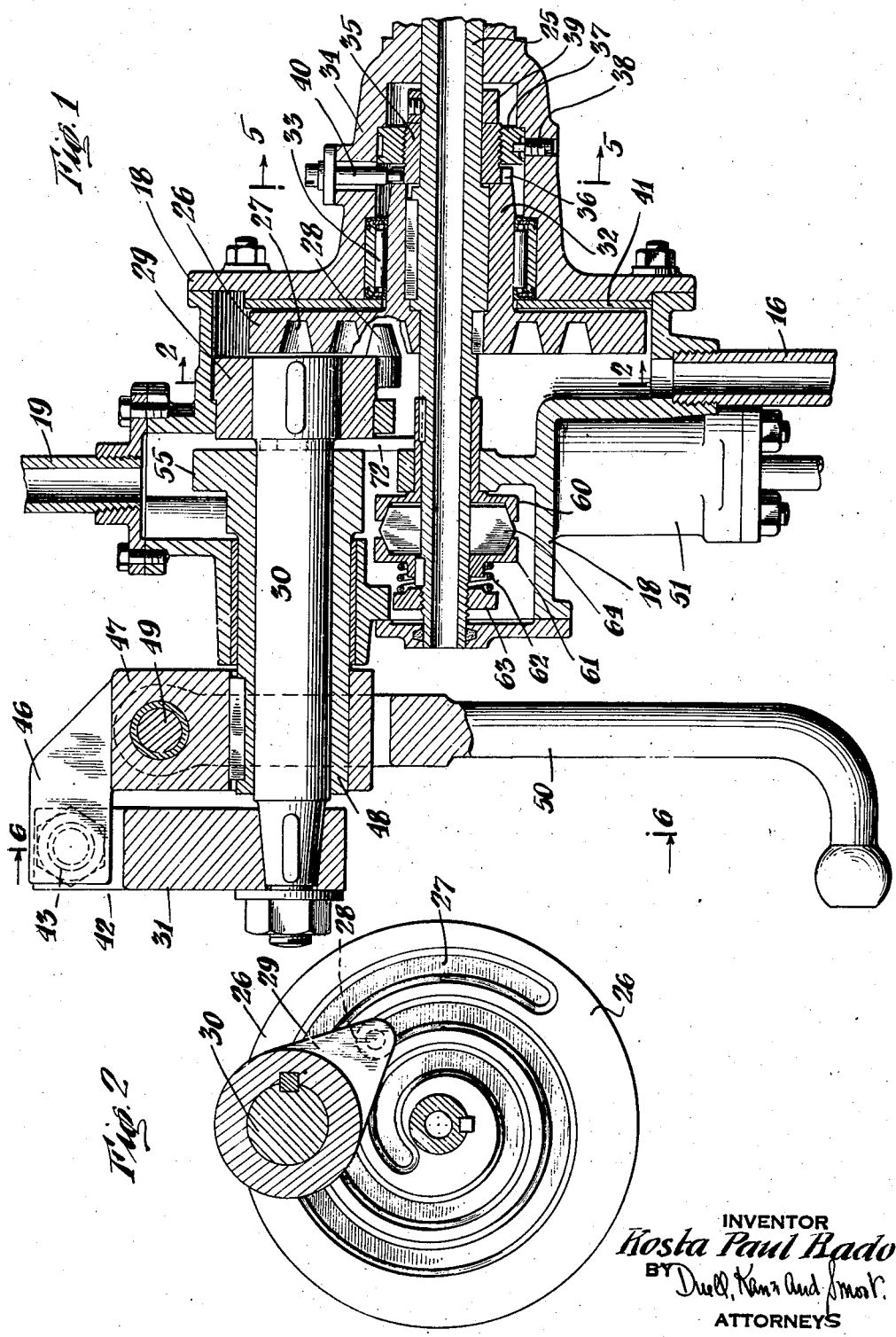
INVENTOR
Kosta Paul Rado
BY
ATTORNEYS

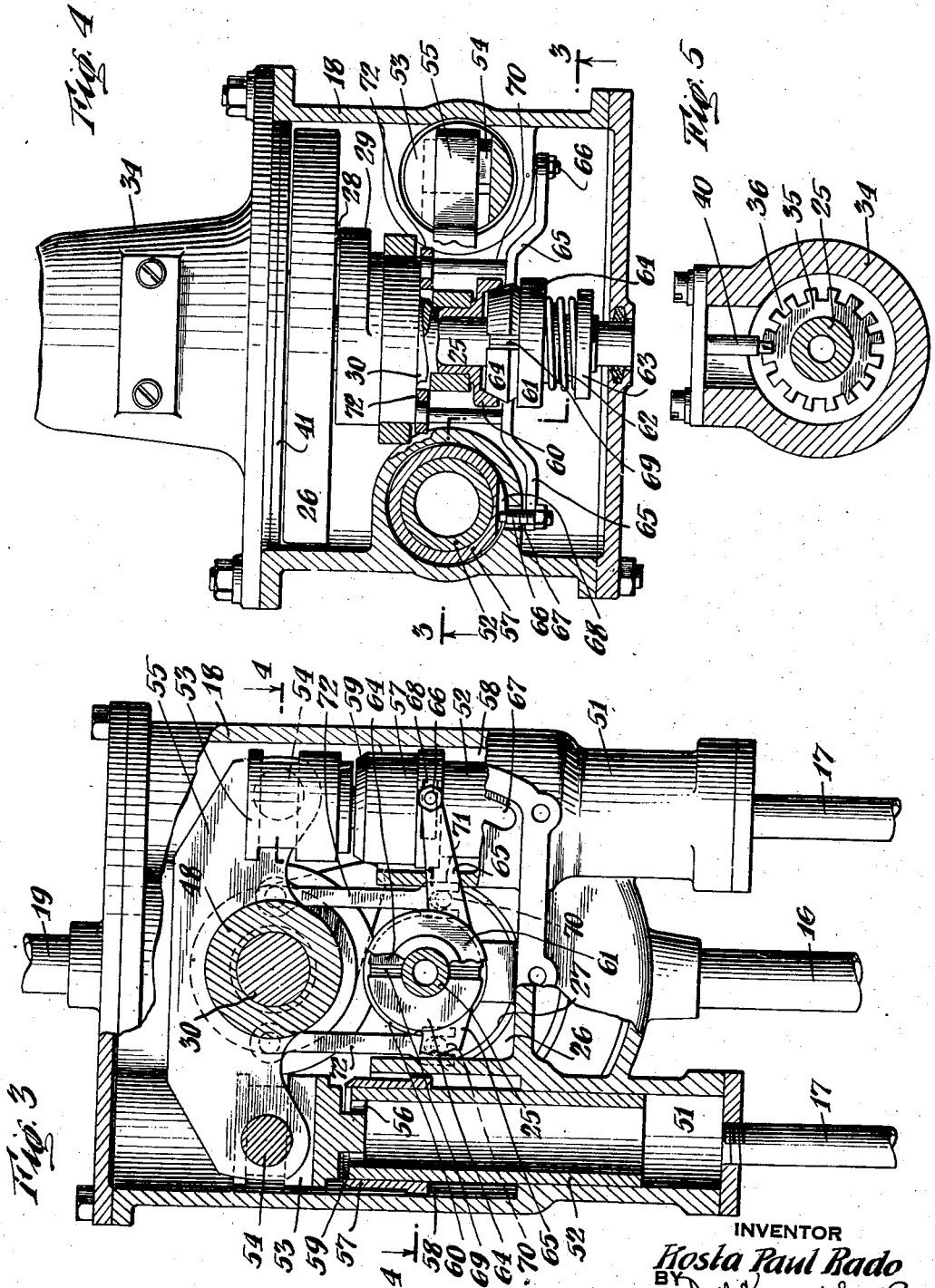

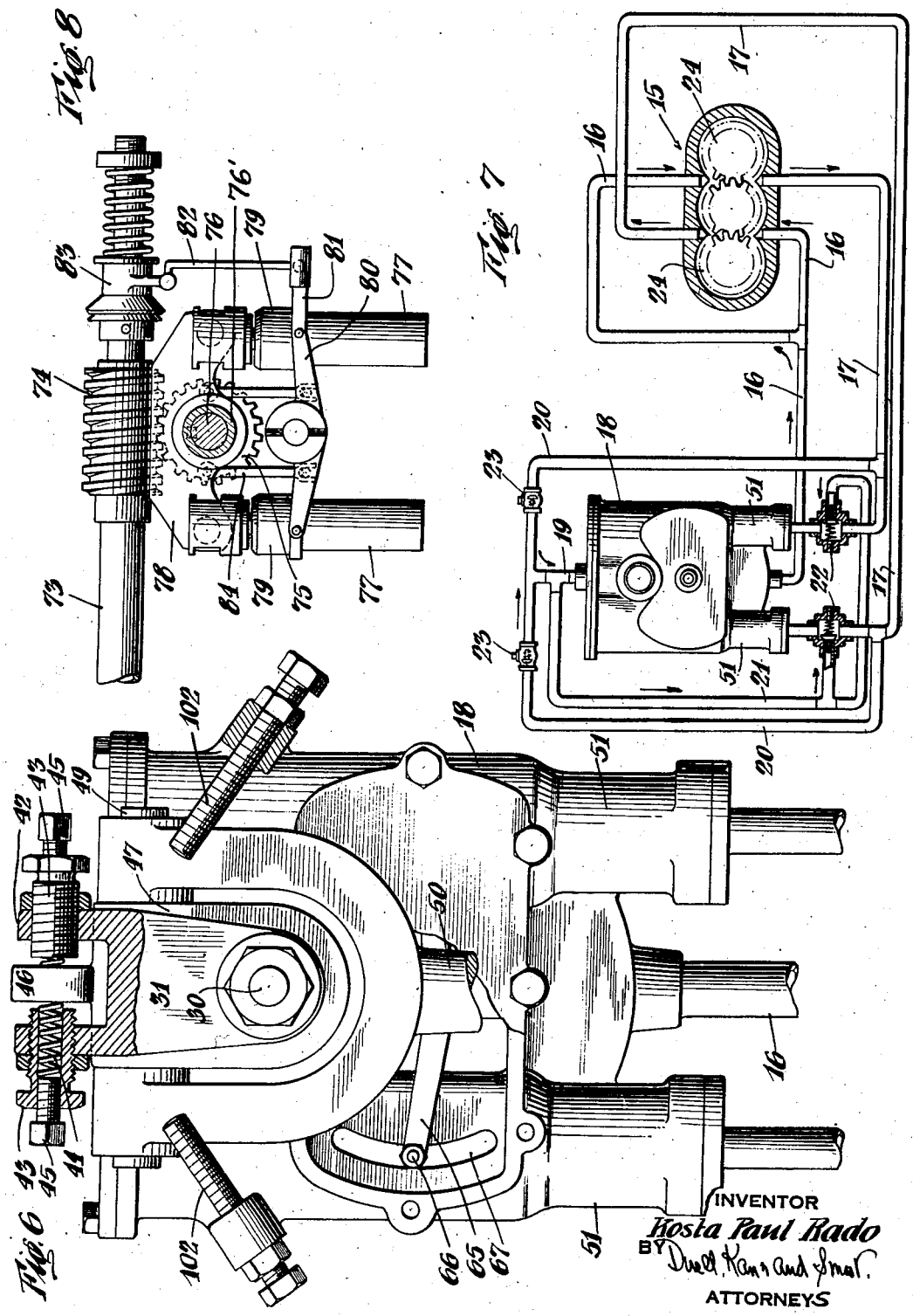

July 22, 1941.  K. P. RADO  2,250,393
CONTROL MECHANISM
Filed Oct. 16, 1937   4 Sheets-Sheet 4
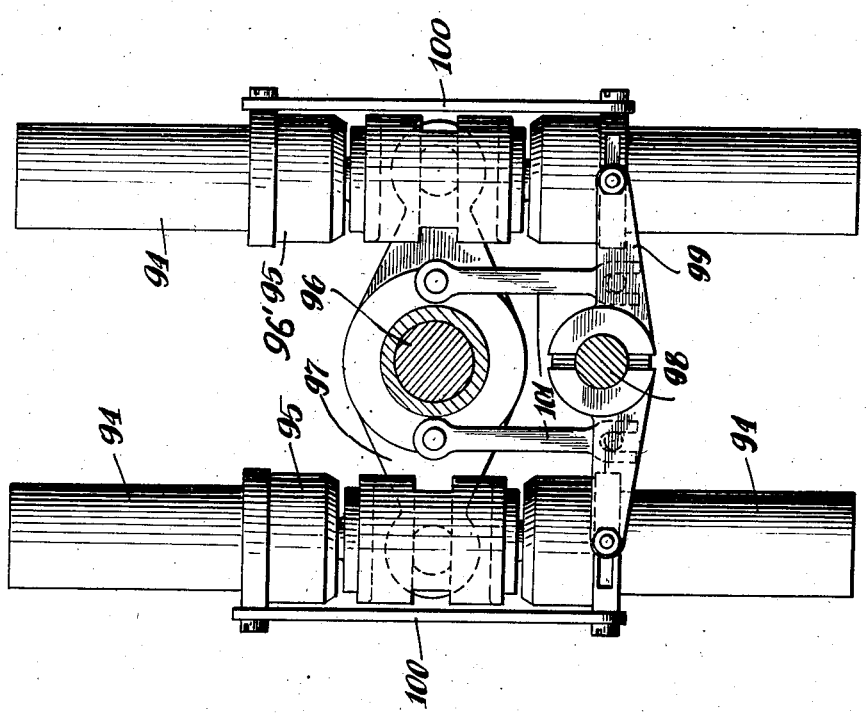
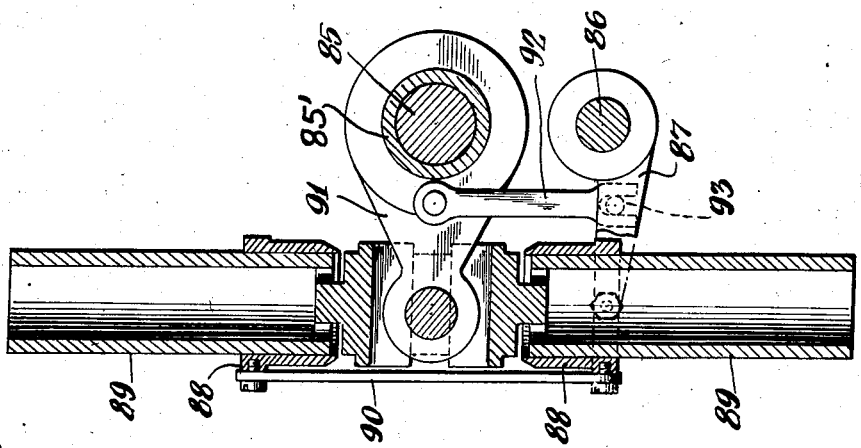
INVENTOR
Kosta Paul Rado
BY
ATTORNEYS Patented July 22, 1941

2,250,393

UNITED STATES PATENT OFFICE 2,250,393

CONTROL MECHANISM

Kosta Paul Rado, Englewood, N. J.

Application October 16, 1937, Serial No. 169,377

18 Claims. (Cl. 180—79.2)

This invention relates to a structurally and functionally improved control mechanism; this application being a continuation in part of my prior application on Control apparatus, filed October 16, 1934, Serial No. 748,450.

It is an object of the invention to furnish a mechanism of this character which in its more specific aspects will be of primary utility when employed in connection with a steering assembly of vehicles and especially dirigible road vehicles. However, it is to be understood that the present invention might be employed in numerous different associations for providing a power shift which may be manually controlled with extreme ease and accuracy.

With primary reference to the preferred embodiment of the present invention, it is to be understood that considerable difficulty has been experienced in providing a steering mechanism suitable for use in connection with vehicles of heavy weight and/or capable of transporting heavy loads. To this end, various suggestions and developments have been made in order to provide a power steering or control mechanism operable with minimum effort by the person in charge of the vehicle and by means of which the movements of the vehicle could be controlled with great accuracy. Numerous difficulties have been experienced in developing designs of this nature, such difficulties involving the questions of bulk, expense, unsatisfactory operation, necessity for dangerous or undesirable pressures, etc.

Also, in a unit of this character it is desirable that an alternative control be embodied. In other words, in addition to the power control— the operation of which should involve a minimum of manual effort—there should be furnished a secondary control which might, for example, be wholly manual. In this way, if the power control becomes inoperative, the operator will still be able to steer the vehicle by means of the manual control. The designing of a mechanism involving such a combination has presented great difficulties, especially having in mind that no conflict may occur between the two parts of the control system. It is obvious, in this connection, that should the power system be capable of assuming a condition in conflict with the manual system, the parts would jam and aside from damage which might occur, the power system would be rendered inoperative. Conversely, if for some reason the power system is not operating and the manual system, in functioning, encounters a condition wherein the inoperative power system will prevent a functioning of the manual system, impossible conditions are presented.

Thus, it is an object of the invention to furnish an improved control mechanism which, in its more specific aspects, is primarily intended for employment as a steering unit of the power type in which there will be embraced both power and manual systems; such systems, however, being so related that under no circumstances will there occur conflict between them.

A further object of the invention is that of furnishing a mechanism of this type which will be extremely compact and light in weight. Accordingly, no difficulties will be encountered in including the same within the design of a vehicle and in fact the present mechanism may readily be applied to heretofore constructed vehicles.

A still further object is that of constructing a unit in which comparatively low pressures may be employed without this in the slightest affecting the response of the mechanism to the will and control of the operator.

Another object is that of providing a design which, in certain respects, will present improvements over the design disclosed in my prior application for United States Letters Patent Serial No. 748,450, filed October 16, 1934, on Control apparatus.

An additional object is that of furnishing a mechanism embodying relatively few parts each individually simple and rugged in construction and operating over long periods of time with freedom from all difficulties.

With these and other objects in mind, reference is had to the attached sheets of drawings, illustrating one practical embodiment of the invention, and in which:

Fig. 1 is a sectional side view taken through the control mechanism;

Fig. 2 is a transverse sectional view taken along the lines 2—2 and in the direction of the arrows of Fig. 1;

Fig. 3 is a partly sectional face view of the unit taken along the lines 3—3 and in the direction of the arrows of Fig. 4;

Fig. 4 is a sectional plan view taken along the lines 4—4 and in the direction of the arrows of Fig. 3;

Figs. 5 and 6 are transverse sectional views taken along the lines 5—5 and 6—6 respectively and in the direction of the arrows of Fig. 1;

Fig. 7 is a diagrammatic representation of the system within which the unit is operatively coupled;

Fig. 8 is a somewhat schematic view showing the invention as applied to a slightly different form of steering mechanism from that heretofore illustrated;

Fig. 9 is a sectional view of a still further form of apparatus, and

Fig. 10 is a front elevation showing the essential working parts of an additional unit which may be constructed in accordance with the teachings of the present invention.

As heretofore observed, that invention has reference to a control mechanism which is to be applied to, for example, a motor vehicle, and will enable the operator, with minimum effort, to control the dirigible or steering wheels of such vehicle. With this thought in mind, the present illustration and annexed description have exemplified such preferred embodiment.

Thus, referring primarily to Fig. 7, the numeral 15 indicates a pump casing having a pair of inlets to which tubes 16 are connected and outlets to which tubes 17 are coupled. A casing is also shown in this view and the detailed construction and enclosed mechanism of which will be hereinafter described in detail. Suffice it to say that the pressure tubes are connected one to each side and preferably adjacent the lower end of the casing while the return tubes 16 are connected to what might be termed the sump portion of casing 18. Additionally, the upper end of this casing may be tapped and connected by a tube 19 with a pair of branches 20 coupled one to each of pressure supply tubes 17 as well as a branch 21. Interposed within each tube 17 are check valves 22, arranged to open, for example, only in the event of negative pressure or actual vacuum and these check valves are coupled one to each of the branches of tube or passage 21. Finally with reference to this view, it will be observed that branches 20 have interposed within their lengths check valves 23 acting in the directions indicated.

It follows as a consequence of this structure that if pump elements 24 within casing 15 are operated, as for example by a power drive coupled to an internal combustion motor or otherwise, fluid such as oil will be drawn through tube 16 and discharged through tube 17. The fluid will be fed to the lower portion of casing 18. If excessive pressures are developed, these will be relieved through branches 20 and the check valves 23 which will permit a direct discharge through tube 19 into, for example, the upper portion of casing 18. Thence this fluid will flow into what might be termed the sump portion of this casing and then into tube 16, whence it will flow into the intake or suction side of the pump assembly. Incidentally, it is to be observed that while the pump assembly may take any desired form, it is preferably, as shown, of the gear type and may include three intermeshing gear elements. Conversely, assuming that the pump assembly is not operating and if mechanism in casing 18 is to function, and that such mechanism in operating would cause a suction within lines 17, it will be understood that a difficult operating condition might be presented. To overcome objections in this connection the valves 22 will function in that they will unseat as soon as conditions within tubes 17 warrant this. Consequently fluid within branches 21 will relieve the conditions of suction and no difficulties will be experienced.

Now referring to the mechanism within casing 18, attention is primarily directed to Figs. 1 to 6 inclusive. In these views the numeral 25 indicates a steering column, or shaft, which may be hollow and which is preferably under manual control. To this end a steering wheel (not shown) may be coupled to the shaft. Also secured to the shaft and within casing 18 is a plate 26 which may have formed in its face a spirally extending groove 27 having inclined side walls. Riding within this groove is a pin 28 preferably having a similar configuration and which forms a part or is secured to a crank 29. This crank is keyed or otherwise fixed to a shaft 30 to which there is fixedly secured a lever 31. The body of plate 26 may be extended as at 32 to encircle a portion of the column 25 to which it is affixed. An anti-friction bearing assembly 33 may be interposed between this extended portion and a corresponding extension 34 forming a part of casing 18. A collar 35 preferably encircles column 25 and presents adjacent its inner end a flange formed with an annular series of serrations 36. The outer face of the collar is threaded and mounts a nut 37 which may be fixed against movement with respect to portion 34 of the housing, for example, by means of a locking pin 38 and the fact that a part of the housing may be extended to somewhat overlap nut 37. It is also to be observed that a collar 39 may be fixedly attached to column 25 to prevent an outward shifting of such column and that the extended portion of housing 34 fixedly mounts pin 40 which engages one of the serrations 36 to prevent movement of the collar 35 with respect to nut 37.

Consequently, when the column is turned, collar 35 will not rotate but will prevent plate 26 from shifting to the right as viewed in Fig. 1. Of course, the plate is prevented from shifting in the opposite direction incident to the provision of collar 39. At this time it will also be observed that a lining surface 41 may be interposed between the inner face of this place and the housing. Assuming that the parts have worn to a point at which the position of the plate should be adjusted, this may readily be achieved by the construction proposed in that pin 40 is simply withdrawn and collar 35 is rotated by, for example, a suitable tool engaging its serrations. Such rotation will cause the collar to be shifted axially by nut 37, thus exerting a thrust against the extended portion 32 of the plate and shifting the latter. When proper adjustment has been achieved, the parts may again be locked against movement.

Referring now to Fig. 6 as well as Fig. 1, it will be observed that the upper end of lever 31 terminates in a forked portion 42, each arm of which carries an inwardly extending stud 43 preferably adjustable with respect to the arm which mounts it. Moreover, each of these studs may support a spring 44 which normally extends beyond the stud end. Again the tension of these springs may, if desired, be adjusted by bolts 45 mounted by the studs. Extending between the arms 42 of the forked portion is an extension 46 which forms a part of an arm 47 fixedly secured against movement with respect to a sleeve 48 rotatably encircling the driving shaft 30. This arm may pivotally or otherwise mount as at 49 a link or arm 50 which, in more or less conventional manner, is coupled to a steering or other mechanism to be controlled.

As a consequence of the foregoing, it will be obvious that as column 25 is rotated, plate 26 will be turned. This will cause pin 28 to traverse groove 27 thus oscillating shaft 30. Incident to the turning of the latter lever 31 will be rocked and as a consequence of the connection existing between this lever and arm 47, the link or arm 50 will be moved. It will also be observed that any shocks transmitted by the link or arm 50 will be cushioned by springs 44 although arm 47 will be prevented from having undue movement with respect to lever 31 in that the extension 46 of this arm will directly contact the stud ends should any tendency in this direction occur. In this matter, it is apparent that a manual control is provided which will enable the operator to actuate the arm 50 or other member to be controlled.

Referring now to Figs. 3 and 4, in addition to Fig. 1, it is to be noted that there is included within the casing 18 a pair of cylinders 51 within which pistons 52 ride. These pistons are preferably tubular and have adjacent their outer ends heads 53 coupled by pin and groove structures 54 to a beam 55. At points adjacent their upper ends, pistons 52 may be formed with slits or passages 56 and flow of fluid through these openings is controlled by valves which are conveniently in the form of sleeves 57 encircling the pistons 52. Adjacent the path of travel of these sleeves, the cylinders (or the bores forming continuations thereof) may be enlarged, as indicated at 58, so that ample space will be provided for the accommodation of the valves. Incidentally, it is preferred that the upper edges of these valves be bevelled inwardly from their outer surfaces as has been indicated at 59. It has been found that as a consequence of such construction fluid flowing past these edges will encounter minimum resistance and be subjected to only a minimum of turbulence. The position of these valves along the pistons 52 is controlled by a pair of arms 65 which move in synchronism.

Now with a view to controlling the position of the valves, it will be observed that column 25 has coupled to it an assembly which acts as, and might properly be termed, a friction or slipping clutch unit. A preferred form of this unit has been illustrated and includes, as in Figs. 1 and 4, a cap member 60 keyed against movement with respect to column 25. A second cap 61 is provided in opposed relationship with respect to cap 60, and is splined on column 25. The second cap is urged towards the first cap by, for example, a spring 62, the tension of which may be controlled by nut 63 threaded onto column 25. Interposed between caps 60 and 61, is a collar rotatably supported upon column 25. As illustrated, this collar may embrace a pair of semi-circular sections 64. The adjacent cap and collar surfaces are formed to mutually interengage and frictionally contact each other. Thus, while the column 25 may be turned with sufficient force to cause rotation of the collar with respect to this column, a normal turning of the collar will result in a synchronized movement of the column.

Secured one to each of the collar sections are arms 65. These arms are coupled to valves 57 as, for example, by securing to the ends of the former studs or pins 66, the bodies of which pass through slots 67 and the ends of which extend into grooves 68, forming parts of valves 57. Thus, it is apparent that under normal circumstances as column 25 is turned arms 65 will be swung, resulting in a movement of one valve 57 inwardly along the piston with which it is associated and a movement of the second valve outwardly with respect to the piston mounting the same. Such movements, of course, result in uncovering or sealing of ports 56 and the corresponding operation of the apparatus will be hereinafter reviewed. However, by having the collar 64 formed of a plurality of sections, it is feasible to insert between the adjacent edges of the different sections one or more shims 69. Thus an operator, by adding shims between certain adjacent edges of collar sections and removing shims from between other adjacent edges, is able to vary the angularity of the arms 65 with respect to each other. Consequently, the apparatus as initially set up may provide for a disposition of valves 57 with respect to ports 56 as shown especially in Fig. 3; or may cause a greater or lesser sealing effect under initial set up and according to conditions hereinafter specified.

Now, with a view to providing a mechanism which will, at all times, harmonize the actions of what might be termed the hydraulic and mechanical sides of the controlling mechanism, it is to be observed that arms 65 carry, for example, pins 70 straddled by the forked ends 71 of links 72. The latter have their upper ends pivotally coupled to the crank 29. It is also to be observed that the connection between the forked ends 71 and the pins should preferably be of such nature that a certain amount of lost motion occurs. However, it will be apparent from this construction that the arms 65 and the shaft 30 must have somewhat synchronized movement. Of course, due to the lost motion connection it is feasible to swing the collar sections 64 to any desired position so that the valves are suitably adjusted, it being, of course, obvious that any desired construction (for instance, in lieu of the shims, semi-circular collar sections, etc.) might be employed to effect such adjustment.

Heretofore the operation of the mechanical side of the mechanism has been traced and as a result of which it is clear that a turning of column 25 results in a turning of shaft 30, incident to plate 26 and crank 29; it being also apparent that rotation of shaft 30 results in a rocking of arm 50.

Now considering purely the hydraulic "side" of the mechanism, it will be apparent that a turning of column 25 results in a shifting of collar 64. Additionally, if the column is turned at too great a rate of speed, no damage to operation can result. In other words, arms 65 may rock at a maximum rate of speed as determined by the mechanical "side" of the apparatus and specifically 30.

With the parts in the position shown especially in Fig. 3, it is apparent that oil under pressure will flow through tubes or lines 17 upwardly through the interiors or bores of pistons 52, and out through ports 56. The flow through the latter will be somewhat impeded incident to the valves 57, but as shown these valves should, in their normal position, preferably provide for a partial uncovering of the ports so that constantly high pressures are not present. Now, with arms 65 rocked, the ports of one piston will be uncovered to a greater extent than that illustrated in Fig. 3, while the ports of the other piston will be sealed or substantially sealed. Consequently, the oil or other fluid flowing through the first piston will not be impeded to any substantial extent and this piston will be free to descend as viewed in Fig. 3. However, incident to the sealing of the ports of the second piston, the oil under pressure will force the piston upwardly as again viewed in Fig. 3. As a consequence of one piston being substantially free to respond to any retracting force while the other of the same is being forcibly projected, beam 55 will rock. Such rocking will cause sleeve 48 affixed to or forming an integral part of the beam, to be rocked. In turn, this movement of the sleeve will cause arm 47 to rock, in turn resulting in a rocking of arm 50.

Of course, the oil flowing through the ports of the pistons escapes in what might be termed the sump portion of the casing and returns through tube 16. Obviously, the position to which the beam 55 and its associated parts have been shifted, will be maintained upon both valves again assuming their initial positions with respect to the pistons with which they are associated. To return the parts to their initial position or beyond the same, simply requires a reverse turning of the column 25. Such turning will obviously cover the ports of the piston which has heretofore had its passages uncovered, and will unseal the ports of the second piston. It now becomes obvious that by providing for adjustment of the arms 65 with respect to each other, an initial installation may be made such that dependent upon the pressures generated by the pump assembly, any given degree of resistance may be provided for. For example, suppose, in the case of a passenger car, arm 50 should offer sixty pounds of resistance against being swung. Under these circumstances a partial uncovering of ports 56 will be proper. However, in the case of a truck or bus where, for example, the arm 50 or its corresponding part will have to suffer greater shocks and will resist any forcible swinging, pressures of, for example, one hundred and fifty pounds might be desired. Again, by simply swinging arms 65 upwardly, as viewed in Fig. 3, a more complete sealing of ports 56 will occur and the desired resistance will be established. These adjustments may be continued up to the limit which the unit is capable of resisting, this being dependent upon the gauge of the parts, the area of the pistons, the hydraulic pressures developed, etc.

If, of course, too great pressures are developed, it follows that as viewed in Fig. 7, the fluid will be by-passed through check valves 23 and flow, for example, into casing 18 through tube 19 and thence to tube 16. However, by virtue of links 72 or a functionally equivalent construction, the manual and hydraulic "sides" of the transmission are always harmonized. This occurs because if an operator attempts to turn column 25 at a rate of speed in excess of that to which the hydraulic "side" may respond, such turning will be checked incident to links 72 or their equivalents. More particularly, crank 29, in being turned by plate 26 will carry with it these links and the latter will prevent arms 65 from moving at too great a rate of speed. In other words, links 72 will act as stops to limit the valve travel and consequently control the covering and uncovering of the slits. Without these links the manual and hydraulic mechanisms would be constantly in interference. This is obvious due to the fact that the levers 65 derive their motion directly from column 25 which turns approximately fifteen times faster than shaft 30. It follows that unless the foregoing structure were provided, the hydraulic apparatus would, through its members 55, 48, 47 and 46, bear down, due to its higher speed, upon the members 42, 31 and 29 of the manual drive with such force that pin 28 would jam in groove 27 and render steering impossible. Therefore, the hydraulic side will not cause any forcible contact between the forked ends of lever 31 and arm 46 or the parts carried thereby. It will be obvious that if such contact should occur, manual operation of column 25 would become very difficult, incident to the translation of pressures back through crank 29 and pin 28 to plate 26. Thus, with the hydraulic apparatus functioning, arm 46 will always be in a balanced position between stop members 43 (or the spring supported thereby) and with respect to the arms of the forked lever 31. Consequently pin 28 will at all times, be substantially centered within groove 27, regardless of how an operator attempts to improperly actuate the control mechanism. This, of course, is quite aside from the slipping or friction clutch structure or coupling existing between column 25 and the arms 65.

In certain instances it may be desired to employ a "worm" type of manual drive instead of the crank and spirally grooved plate structure especially illustrated in Fig. 2. With a view to adapting the present invention to such a form of construction, attention is directed to Fig. 8. In this view the reference numeral 73 identifies a column corresponding to column 25 and to which in a conventional manner a worm 74 is secured. This worm drives a worm wheel 75 suitably coupled to a shaft 76 encircled by a sleeve 76' corresponding to sleeve 48. An arm (not shown) corresponding to arm 50 is connected to this sleeve. Pistons 77 corresponding to pistons 52 are provided and are coupled to a beam 78 connected to the sleeve 76', the latter being coupled, for example, as aforetaught, to the steering shaft 76. The valves 79 are actuated by arms 80 corresponding to links 65 and one of these links may be extended as at 81 and be link connected as at 82 to a friction or slipping clutch structure 83. The latter is associated with column 73 and safety stops or controls in the form of links 84 may extend between the worm wheel 75 and arms 80.

Obviously, as column 73 is turned, worm wheel 75 will be turned to shift link 82. It will, of course, be understood that the link will shift as soon as column 73 is turned and will accordingly actuate the valves. This will, in turn, cause movements on the part of the pistons and a power turning of the shaft which is to be controlled. Due to the fact that a certain amount of play occurs between worm 74 and worm wheel 75, it is apparent that the shifting of the valves will occur as an initial condition and before actual manual shifting or turning of the shaft occurs; this being true unless no hydraulic pressure exists. If an attempt is made to turn the column at too great a rate of speed, a slipping may occur on the part of the clutch assembly 83, so that arms 80 may not be forced to move at too great a rate of speed. Thus, valves 79 may be moved, but an improper movement thereof will be prevented by links 84. Consequently if such a type of operation is resorted to, beam 78 cannot shift at too high a rate of speed, and incident to these links 84 or their equivalent arms 80 will prevent the manual "side" of the mechanism from being operated at a speed such that it would not be properly correlated to the hydraulic "side" thereof.

In case it were desired to employ opposed pistons, a structure such as that suggested in Fig. 9 might be utilized and in which the numeral 85 designates the steering shaft and 86 the steering column. By means of a slipping or friction clutch assembly (which together with the mechanical coupling between the shaft 85 and column 86 has not again been shown in this view) an arm 87 is caused to rock in response to movements on the part of column 86. This arm will control the position of valves 88 upon pistons 89, thus sealing the ports of the latter to a greater or lesser extent. The movements of the valves may be synchronized by a link 90, and a crank 91 corresponding to beams 55 and 78 may be coupled to these pistons and as aforedescribed to sleeve 85'. A link 92 may couple arm 87, by means of the usual pin and fork structure 93, to the manual "side" of the unit.

As column 86 is turned, the manual drive (not shown) is actuated and the valves 88 are shifted. This causes pistons 89 to be shifted and results in an operation of sleeve 85' through crank 91. A conflict between the manual drive and the hydraulic drive is precluded by the links 92 or their functional equivalents.

In the form of structure shown in Fig. 10, a system has been designed which will provide for high drive values on the part of the hydraulic portion of the unit. Again, the mechanical coupling between shaft 96 and column 98 has not been shown. To this end four pistons 94 have been shown and the movements of each of which are controlled as aforedescribed by valves 95. In many respects this form of unit is a mere duplication or multiplication of the mechanism shown in Fig. 9. Thus, the steering shaft 96 is encircled by a beam 97 coupled as aforetaught by means of a sleeve 96' to that shaft, and the steering column 98 has coupled to it control arms 99 corresponding to arms 65. The movements of the pistons are synchronized by, for example, links 100, it being obvious that the ends of the beam 97 are coupled to the respective pairs of pistons. Also, control links or their equivalent 101 extend between arms 99 and pins connected to the manual "side" of the unit.

As fluid acts upon this unit incident to the turning of column 98, the pistons will reciprocate to oscillate beam 97 and thus on sleeve 96' to rock the latter, and if desired an arm corresponding to arm 50. Again, in this form of construction no conflict may occur between the manual and hydraulic "sides" because the links 101 are connected to the manually actuatable shaft 96. Accordingly, if there is any tendency of the parts to operate improperly, the links will correct this by controlling the movement of arms 99.

In all of these several forms of apparatus it has heretofore been apparent that an operator need possess no especial skill to cause a functioning of the apparatus and even in the case of obviously improper operation, no jamming of the hydraulic—by the mechanical "side"—can occur. Now assuming that for some reason the hydraulic portion of the unit is not operating, it will likewise be apparent that this will not render the mechanical drive of the mechanism inoperative or difficult to operate. In this connection and as aforebrought out, it has been seen that suction in either of branches 17 results in an unseating of valves 22, thus relieving conditions of vacuum. Consequently, the operator will not experience any major difficulty in causing reciprocation of the pistons within the cylinders and incident to operation of the mechanical drive of the unit. Any condition tending toward this result will, in fact, be further relieved, due to the provision of the slipping clutch 72, or its equivalent. Thus, with shaft 30 operating, arms 65 will be rocked to correspondingly move the valves 51, pistons 52, beam 55, sleeve 48 and arm 50. Consequently, in the case of a downward movement of one of the pistons 52, as viewed in Fig. 3, the operator will not have to work against a condition of pressure which might otherwise come into being. This will be because the valve associated with that piston will vent or permit a flow of fluid through the ports thereof. The conditions of vacuum which might otherwise effect the second piston will, of course, be relieved by one of the valves 22.

Stops 102 may be associated with casing 18 and within the path of travel of lever 31. It follows that when this lever reaches its limit of travel (either by way of manual or hydraulic actuation), its further movements will be prevented, incident to one of the stops 102. The position of the latter may, of course, be varied, but the parts should ordinarily be adjusted so that the hydraulic "side" of the unit may continue to function to zones slightly beyond that defined by the stops. Consequently, even if the mechanical actuation is occurring, the movement of lever 31 will be stopped at a point in advance of that to which arm 47 may, under extreme conditions, move. Consequently, if thereupon the hydraulic system should begin to function, arm 47 may shift to a position at which both valves equally vent the ports of both pistons.

Obviously, each of the pistons, as viewed in Figs. 1 to 9 inclusive, should be provided with independent pressure passages. In the case of the construction shown in Fig. 10, the pistons at diametrically opposite points might be connected to common pressure passages.

As a consequence of any or all of the foregoing structures, units are furnished which provide for what might be termed measured steering. These units may be adjusted so that a condition of balance is created to maintain the travel of the vehicle to any given path and regardless of the effort required for such maintenance. This is achieved by simply swinging the arms 65 or their equivalents with respect to each other or otherwise adjusting the valves with respect to the pistons mounting the same. Of course, when the manually controlled column is turned, the pressure against one of the pistons increases gradually until the pressures in both cylinders is equalized. Moreover, units constructed in accordance with the teachings of the present invention act to absorb shocks and prevent their transference to the manually controlled column. While the latter initiates the movement of arm 50 or its equivalent, the latter cannot transmit the shocks back to such column and the arm will immediately return to its initial position. However, the slightest movement on the part of the column will cause the mechanism to respond by shifting the unit or units to be controlled to exactly the position desired.

Thus, among others, the several objects of the invention as aforenoted are achieved. It will be obvious that numerous changes in construction and rearrangement of the parts might be resorted to without departing from the spirit of the invention as defined by the claims.

Having described my invention, what I claim as new and desire to secure by Letters Patent is:

1. A control apparatus including a shaft, a sleeve encircling said shaft and rotatable with respect thereto, lost motion means for coupling said sleeve and shaft, a member to be moved and connected to said sleeve and shaft, manually operable means for moving said shaft, a motor coupled to said sleeve, a control shaft, means for coupling said control shaft to said manually operable means, and a slip clutch structure coupled to said latter shaft and to said motor for governing the operations of the latter.

2. A control mechanism including a member to be moved, a hydraulic motor coupled to said member to shift the same, a spirally grooved plate, a pin riding within the groove of such plate, a crank mounting such pin and coupled to such member to also move the same, a manually rotatable shaft, means for coupling said shaft with said motor to govern the operations of the latter, said plate being also coupled to said shaft, and means coupled to said motor and connected to said shaft to prevent a conflict in operation between said motor and said plate and pin structure.

3. A control mechanism including a member to be moved, a hydraulic motor coupled to said member to shift the same, a spirally grooved plate, a pin riding within the groove of such plate, a crank mounting such pin and coupled to such member to also move the same, a manually rotatable shaft, friction clutch means for coupling said shaft with said motor to govern the operations of the latter, said plate being also coupled to said shaft, and means coupled to said motor and connected to said shaft to prevent a conflict in operation between said motor and said plate and pin structure.

4. A control mechanism including a manually rotatable shaft, a worm connected to said shaft, a member to be moved, a worm wheel connected to said member and meshing with said worm, a hydraulic motor, a pair of pistons disposed beside each other and forming a part of said motor, means for coupling said pistons to have synchronized movements and for connecting the same to said member to be moved, means for governing the operations of said pistons and connected to said shaft, and means extending between said governing means and said member to be moved for controlling the operation of said governing means.

5. A control mechanism including a manually rotatable shaft adapted to mount a member to be moved, said shaft and member being adapted to be connected by a positive drive whereby a rotation of said shaft will move said member, said control mechanism additionally comprising a hydraulic motor, opposed pistons disposed substantially in line with each other and forming a part of said motor, means for coupling said pistons to have synchronized movements and for connecting the same to said member to be moved, means for governing the operations of said pistons and connected to said shaft, and means extending between said governing means and said member to be moved for controlling the operation of said governing means.

6. A control mechanism including a manually rotatable shaft adapted to mount a member to be moved, said shaft and member being adapted to be connected by a positive drive whereby a rotation of said shaft will move said member, said control mechanism additionally comprising a hydraulic motor, pairs of pistons disposed beside each other, the individual pistons of each pair being arranged substantially in line with each other and in opposed relation, said pistons forming a part of said motor, means for coupling said pistons to have synchronized movements and for connecting the same to said member to be moved, means for governing the operations of said pistons and connected to said shaft, and means extending between said governing means and said member to be moved for controlling the operation of said governing means.

7. A steering gear apparatus including a steering gear arm to be oscillated, a shaft mounting said arm, a beam rotatable upon said shaft, a cylinder, a ported piston movable within said cylinder and connected to said beam, said cylinder being constantly connected to a source of fluid under pressure, a rotatable steering shaft, a member secured to said latter shaft, a valve for controlling the flow of fluid through said port, said valve being connected to said member to respond to movements of said steering shaft, whereby said piston and beam may, under the influence of said pressure fluid, move in one direction, and means for moving said piston and beam in an opposite direction.

8. A steering gear apparatus including a steering gear arm to be oscillated, a shaft mounting said arm, a beam rotatable upon said shaft, a cylinder, a ported piston movable within said cylinder and connected to said beam, said cylinder being constantly connected to a source of fluid under pressure, a rotatable steering shaft, a member secured to said latter shaft, a valve for controlling the flow of fluid through said port, said valve being connected to said member to respond to movements of said steering shaft, whereby said piston and beam may, under the influence of said pressure fluid, move in one direction, and means for moving said piston and beam in an opposite direction, and mechanical drive means coupling said steering arm shaft with said steering shaft whereby as the latter rotates said steering arm shaft will be oscillated.

9. A steering gear unit including a member to be driven, a manually rotatable steering shaft, a beam connected to said driven member, a cylinder to be connected to a source of fluid under pressure, a piston disposed within said cylinder and connected to said beam to oscillate the latter, said piston being formed with a port for the escape of fluid from said cylinder, a sleeve normally closing said port and movable to port uncovering position, means connecting said sleeve with said rotatable steering shaft whereby to control the position of said sleeve upon said piston, whereby said piston and beam may, under the influence of said pressure fluid, move in one direction, and means for moving said piston and beam in an opposite direction.

10. A steering gear unit including a member to be driven, a manually rotatable steering shaft, a beam connected to said driven member, a cylinder to be connected to a source of fluid under pressure, a piston disposed within said cylinder and connected to said beam to oscillate the latter, said piston being formed with a port for the escape of fluid from said cylinder, a sleeve normally closing said port and movable to port uncovering position, means connecting said sleeve with said rotatable steering shaft whereby to control the position of said sleeve upon said piston, and whereby said piston and beam may, under the influence of said pressure fluid, move in one direction, means for moving said piston and beam in an opposite direction, and a mechanical drive connection extending between said driven member and said rotatable steering shaft.

11. A steering gear unit including a shaft to be driven, a manually rotatable steering shaft, a beam connected to said driven shaft, a cylinder to be connected to a source of fluid under pressure, a piston disposed within said cylinder and connected to said beam to oscillate the latter, said piston being formed with a port for the escape of fluid from said cylinder, a sleeve normally closing said port and movable to port uncovering position, means connecting said sleeve with said rotatable steering shaft whereby to control the position of said sleeve upon said piston, and whereby said piston and beam may, under the influence of said pressure fluid, move in one direction, means for moving said piston and beam in an opposite direction, a member formed with a spirally extending groove and secured to said steering shaft, and a pin carrying crank secured to said driven shaft with its pin disposed within such groove whereby to provide a mechanical connection between said steering and driven shafts.

12. A steering gear unit including a member to be driven, a manually rotatable steering shaft, a beam connected to said driven member, a cylinder to be connected to a source of fluid under pressure, a piston disposed within said cylinder and connected to said beam to oscillate the latter said piston being formed with a port for the escape of fluid from said cylinder, a sleeve normally closing said port and movable to port-uncovering position, means connecting said sleeve with said rotatable steering shaft whereby to control the position of said sleeve upon said piston, and whereby said piston and beam may, under the influence of said pressure fluid, move in one direction, means for moving said piston and beam in an opposite direction, a mechanical drive connection extending between said driven member and said rotatable steering shaft, said connection incorporating play adequate to permit of a shifting of said valve without positively effecting drive by said mechanical connection from said steering to said driven member.

13. A steering gear including a member to be driven and to be connected to a steering apparatus, a manually rotatable steering shaft, a pair of cylinders, pistons disposed within said cylinders and formed with ports for the escape of fluid under pressure, said cylinders being adapted to be connected to a source of fluid pressure, a beam connecting said pistons to said driven member, valves associated with said pistons and a member connecting said valves to each other and with said steering shaft.

14. A steering gear including a member to be driven and to be connected to a steering apparatus, a manually rotatable steering shaft, a pair of cylinders, pistons disposed within said cylinders and formed with ports for the escape of fluid under pressure, said cylinders being adapted to be connected to a source of fluid pressure, a beam connecting said pistons to said driven member, valves associated with said pistons, a member connecting said valves to each other and with said steering shaft, said driven shaft being extended, a crank carried by the extended portion of said shaft, and means mechanically connecting said steering shaft with said crank to positively drive said driven member as said steering shaft is rotated.

15. A steering apparatus including a driven steering member, a manually rotatable steering shaft, a pair of cylinders constantly connected to a source of fluid under pressure, ported pistons disposed within said cylinders, means for connecting said pistons to each other and to said driven member, sleeves encircling said pistons and movable with respect thereto to uncover and cover the ports formed therein, and means connecting said manually operated steering shaft with said sleeves to shift the latter.

16. A steering apparatus including a driven steering shaft, a manually rotatable steering shaft, a pair of cylinders constantly connected to a source of fluid under pressure, ported pistons disposed within said cylinders, means for connecting said pistons to each other and to said driven shaft, sleeves encircling said cylinders and movable with respect thereto to uncover and cover the ports formed therein, means connecting said manually operated steering shaft with said sleeves to shift the latter, a spirally grooved member secured to said manually operable steering shaft, and a crank connected to said driven shaft and to said member to be positively oscillated by the latter.

17. A steering gear apparatus including a steering gear arm to be oscillated, a shaft mounting said arm, a beam rotatable upon said shaft, a cylinder, a ported piston movable within said cylinder and connected to said beam, said cylinder being constantly connected to a source of fluid under pressure, a rotatable steering shaft, a valve for controlling the flow of fluid through the port of said piston whereby the fluid under pressure may act upon said piston to move the same in one direction, means for moving said piston in an opposite direction, and lost motion means operatively connecting said valve with said steering shaft.

18. A steering gear apparatus including a steering gear arm to be oscillated, a shaft mounting said arm, a beam rotatable upon said shaft, a cylinder, a ported piston movable within said cylinder and connected to said beam, said cylinder being constantly connected to a source of fluid under pressure, a rotatable steering shaft, a valve for controlling the flow of fluid through the port of said piston whereby the fluid under pressure may act upon said piston to move the same in one direction, means for moving said piston in an opposite direction, and friction coupling means for connecting said valve with said steering shaft whereby to operate the former in response to movements of the latter.

KOSTA PAUL RADO.